United States Patent [19]
Grewette et al.

[11] B 3,990,543
[45] Nov. 9, 1976

[54] BRAKE LINING CONDITIONING MEANS

[75] Inventors: Richard S. Grewette, Utica; Robert J. Hammersmith, Rochester; Richard F. Honigsbaum, Troy, all of Mich.

[73] Assignee: General Motors Corporation, Detroit, Mich.

[22] Filed: Dec. 23, 1974

[21] Appl. No.: 535,411

[44] Published under the second Trial Voluntary Protest Program on February 24, 1976 as document No. B 535,411.

[52] U.S. Cl. .................................. 188/71.1; 51/161; 51/241 R
[51] Int. Cl.² ...................................... F16D 55/224
[58] Field of Search ............... 188/73.1, 71.1, 1 R; 192/111 A; 51/161, 106 R, 132, 241 R, DIG. 3

[56] References Cited
UNITED STATES PATENTS

| | | | |
|---|---|---|---|
| 2,102,915 | 12/1937 | Riskel | 51/DIG. 3 |
| 2,389,772 | 11/1945 | Gilbert | 188/73.1 |
| 2,695,695 | 11/1954 | Gilfillan et al. | 192/111 A |
| 3,590,537 | 7/1971 | Hennig et al. | 51/132 |
| 3,628,639 | 12/1971 | Daley, Jr. | 188/73.3 |

Primary Examiner—Trygve M. Blix
Assistant Examiner—Edward R. Kazenske
Attorney, Agent, or Firm—D. D. McGraw

[57] ABSTRACT

A disc brake assembly is provided with a mechanism for dressing the disc brake lining during reverse movement of the vehicle on which the brake is installed. A suitable dressing material or mechanism is urged into engagement with the brake lining friction surfaces so that when the disc on which the linings act is rotated in accordance with reverse movement of the vehicle, the lining friction surface is dressed.

6 Claims, 5 Drawing Figures

BRAKE LINING CONDITIONING MEANS

The invention relates to means for dressing the friction surfaces of disc brake linings when the vehicle on which the disc brakes are mounted is moved in the reverse direction. Dressing the linings, which involves either abrading them or using cutters which act somewhat like a file, reduces brake squeal. It is a feature of the invention to provide a mechanism for dressing the brake linings intermittently, and particularly only during one mode of vehicle operation which occurs for short periods of time but sufficiently often during normal vehicle operation to maintain the linings in a dressed condition.

In one embodiment of the invention abrasive or abrasive surfaced dressing members are mounted in the brake disc and extend through slots in the disc for engagement with the friction surfaces of the brake linings. The abrasive dressing members are so oriented that the abrasive action is effected only in the reverse rotational direction of the disc. The abrasive dressing members are lightly urged into engagement with the brake linings by a compression spring element.

Another modification embodying the invention utilizes dressing members having cutters with cutting edges either made of or surfaced with a hard material and so profiled that cutting is effected only in the reverse direction of disc rotation. Such cutting edges are much like the cutting surfaces of files and burrs. A spring urges the cutters toward the brake linings.

A third embodiment of the invention utilizes pivoted, spring-loaded cutting arms as dressing members which act in a similar manner to the cutters of the second embodiment.

A fourth embodiment of the invention involves the use of dressing members in the form of abrasive coated cylinders mounted through one-way clutches and yieldably urged into engagement with the brake lining friction surfaces so that the cylinders rotate freely during forward disc rotation but act to abrade the friction surfaces of the linings during reverse disc rotation.

IN THE DRAWING

Figure 1:
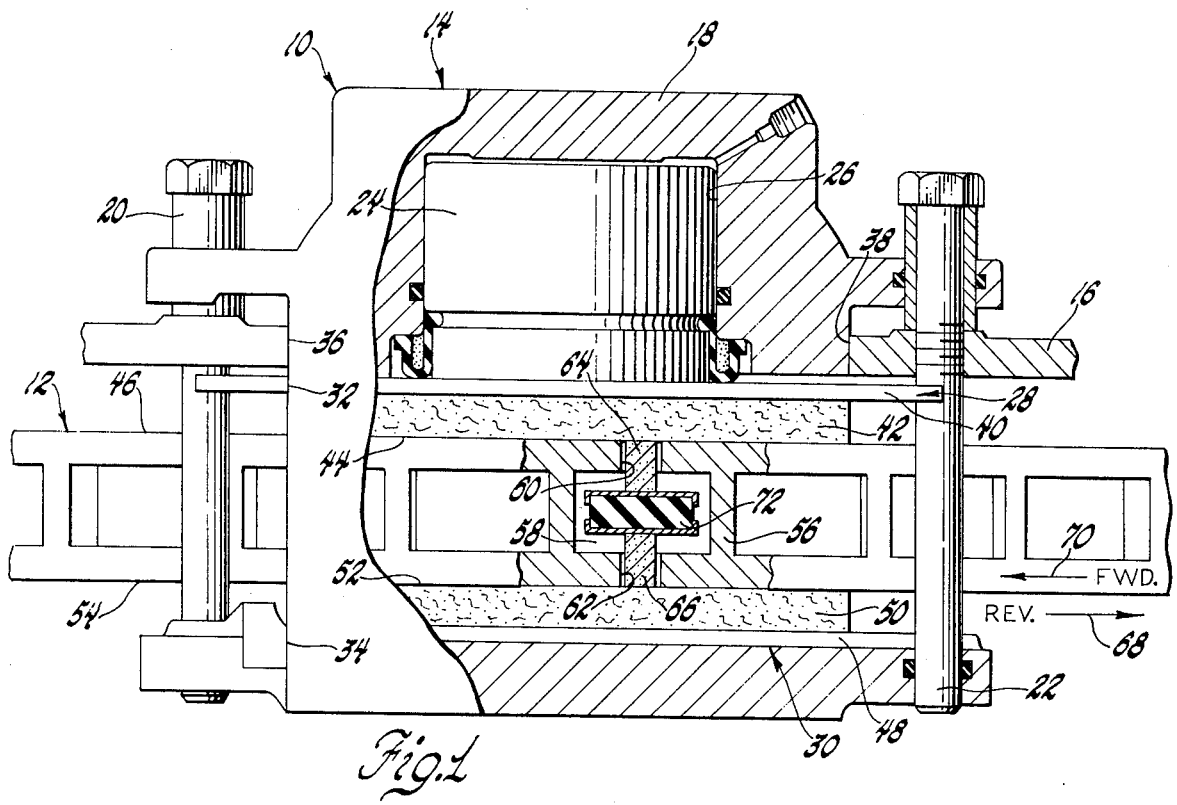
FIG. 1 is a view of a disc brake assembly embodying the invention and having parts broken away and in section.

The disc brake assembly is illustrated as being of the same type as that disclosed in U.S. Pat. No. 3,628,639, entitled "Disc Brake Caliper Mounting Means," and issued Dec. 21, 1971. The disc brake assembly 10 includes a disc 12, a caliper assembly 14 and a caliper support bracket 16. The disc brake assembly is of the sliding caliper type. The caliper housing 18 is mounted on pin assemblies 20 and 22, which are secured to support bracket 16, to permit the caliper housing to move parallel to the axis of rotation of disc 12 as the brake pad linings wear. A piston 24, reciprocably mounted in a cylinder 26 formed in housing 18, engages a brake pad assembly 28 so that when the cylinder 26 is pressurized the brake pad assembly 28 will engage the disc 12 in braking relation and the caliper housing 18 will move a brake pad assembly 30 into braking engagement with the other side of the disc. Brake torque is transmitted from the brake pad assemblies to the caliper housing by abutments 32 and 34, and from the caliper housing to the support bracket 16 through abutment 36 or abutment 38. This arrangement is disclosed in the above mentioned patent and is well known in the art.

Brake pad assembly 28 is composed of a backing plate 40 and a brake lining 42. The lining has a friction surface 44 positioned for braking engagement with friction braking surface 46 of disc 12. The brake pad assembly 30 includes a backing plate 48 and a brake lining 50. Brake lining 50 has a friction surface 52 which is positioned in braking relation to the friction braking surface 54 of disc 12. The disc is illustrated as being of the ventilated type with radially arranged ribs 56 cooperating to join the disc sides on which surfaces 46 and 54 are provided and to define therewith air cooling passages 58. In employing any of the various mechanisms embodying the invention, one or more cooling passages 58 are utilized to mount the abrading mechanism. Only one such mechanism is illustrated, but more than one mechanism may be provided in each disc if desired. Slots 60 and 62 are provided through the disc side surfaces defining one of the cooling passages 58. Dressing members formed as abrasive segments or cutters 64 and 66 extend through the slots 60 and 62, respectively, and are urged into engagement with the brake lining surfaces 44 and 52, respectively. In the embodiment shown in FIG. 1 dressing members 64 and 66 are vane-like segments made of an abrasive or an abrasive surfaced material arranged with the abrasive particles so oriented that abrasive action against surfaces 44 and 52 occurs only when disc 12 is rotating in the reverse direction indicated by arrow 68. When the disc is rotating in the forward direction, indicated by arrow 70, there is no abrasive effect on surfaces 44 and 52. The same effect can be achieved by loosely fitting the segments 64 and 66 in slots 60 and 62 so that the segments are cocked into an inefficient, non-abrading position by forward rotation of disc 12. In either case, abrasive action can take place only when the disc 12 rotates in the reverse direction. The segments 64 and 66 are held in place by a spring-like member 72, which is illustrated in FIG. 1 as being an elastomeric plug. The dressing depth is controlled by the force resulting from compression of the plug 72 and the limit of expansion of the plug. The dressing depth is such that dressing action is obviated when the brake is not actuated.

Figures 2, 3, 4:
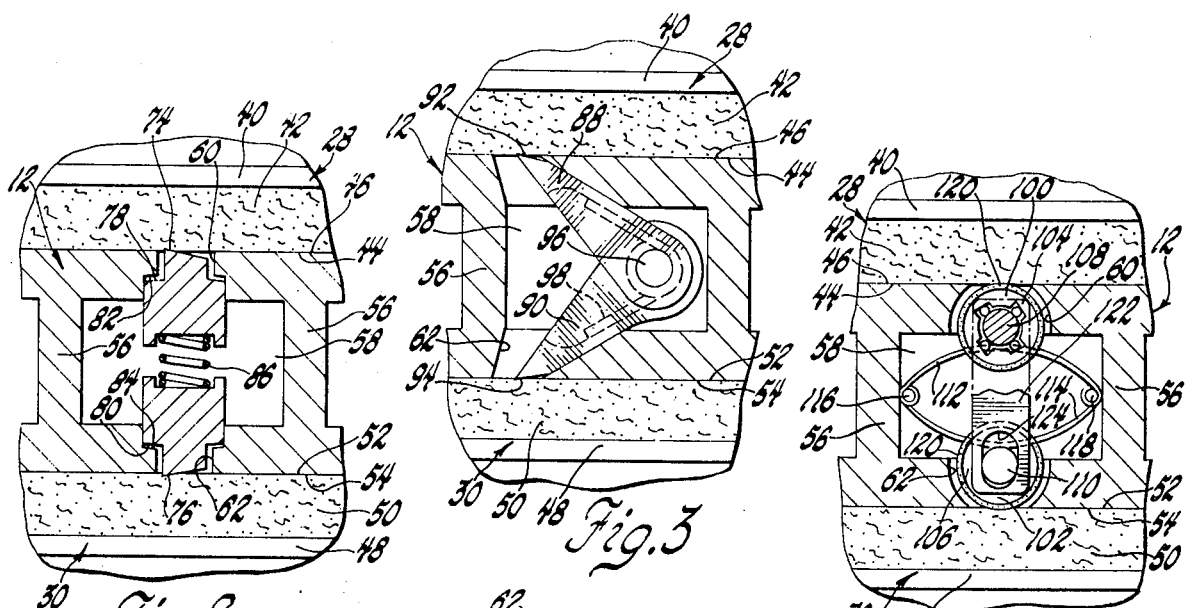
FIG. 2 is a fragmentary portion of an assembly like that of FIG. 1 and showing a modified structure embodying the invention.
FIG. 3 is a fragmentary portion of an assembly like that of FIG. 1 and showing a modified structure embodying the invention.
FIG. 4 is a fragmentary portion of an assembly like that of FIG. 1 and showing a modified structure embodying the invention.
Figure 5:
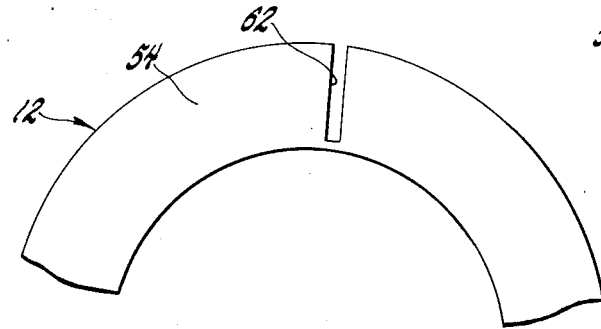
FIG. 5 shows a segment of a disc provided with slots through which the abrading mechanism extends.

The modification illustrated in FIG. 2 includes the provision of dressing members in the form of cutters 74 and 76 positioned in slots 60 and 62. In this instance the cutters are provided with shoulders 78 and 80 which match shoulders 82 and 84 formed in slots 60 and 62. A compression spring 86 urges the cutters 74 and 76 outwardly into engagement with the brake lining surfaces 44 and 52. The cutters are preferably made of or surfaced with a hard material such as tungsten carbide, and are so profiled that cutting is effected only in the reverse direction of disc rotation. They are ramped for ease of entry onto and departure from the friction lining surfaces. The cutting profiles are well known and of a type used on files and burrs. The shoulders on the slots and the cutters limit the outward travel of the cutters so that the amount of material cut or abraded during reverse disc rotation is also limited, and no dressing action takes place when the brake is released.

The modification shown in FIG. 3 utilizes dressing members formed as a pair of pivoting arms 88 and 90 which are made somewhat like blades with cutting edges 92 and 94 on the respective outer ends thereof. The inner ends of arms 88 and 90 are slotted and interleafed so that they are mounted on pin 96 in brake disc 12 and can pivot about the pin as needed. A torsion spring 98 urges the cutters outwardly through slots 60 and 62. The mounting angles of the arms 88 and 90 as seen in FIG. 3 are such that cutting action is limited to reverse disc rotation. The depth of cut is limited by engagement of the arms with the beveled side walls of the slots.

The embodiment shown in FIG. 4 includes dressing members formed as a pair of cylinders 100 and 102 respectively mounted through one-way clutches 104 and 106 on pins 108 and 110. These pins are mounted on the disc 12 so that cylinders extend through slots 60 and 62. In this instance the slots are cylindrical segments with one side in each instance opening through its adjacent friction braking surface 46 and 54 so that the outer surfaces of the cylinders 100 and 102 are respectively engageable with the brake lining surfaces 44 and 52. Pins 108 and 110 are mounted in the disc for slight movement toward and away from the disc surface 46 and 54, and are urged toward the surfaces by a leaf spring arrangement including springs 112 and 114, which are mounted on pins 116 and 118. These pins are positioned in the cooling passage 58 and permit the springs to yieldably urge the cylinders outwardly. The cylinders are coated with an abrasive layer of material 120 so that this material engages the brake linings.

The mounting arrangement of pins 108 and 110 is illustrated with regard to pin 110 in FIG. 4. Mounting plates 122 are secured to the disc and have slots 124 therein receiving the pins 108 and 110. The slot 124 receiving pin 110 is shown. The pins can move in these slots to permit the cylinders to extend out of the slots 60 and 62 and to move against the forces of springs 112 and 114 when the brake is actuated. The force of springs 112 and 114 urging the cylinder abrasive surfaces against the lining friction surfaces controls the depth of the dressing action.

So long as the discs rotate in the forward rotation, the cylinders can also rotate on their respective pins 108 and 110 due to the free wheeling action of their clutches 104 and 106. However, when the disc is rotating in the reverse direction, the cylinder cannot rotate due to the action of the clutches, and the brake lining surfaces 44 and 52 are dressed by abrasive action of the abrasive layer of material 120 when the brake is actuated.

While the invention has been disclosed and described in detail as being in a disc brake, it is also feasible to adapt it to other types of brakes such as drum brakes, mounting the dressing members in slots in the drums so that they can dress the brake shoe linings during reverse operation. Also, the dressing members may be so oriented as to operate during any reverse movement of the rotatable member to be braked, whether or not the brake assembly is actuated, should the need for more frequent or prolonged dressing action be felt.

What is claimed is:
1. In a disc brake assembly having a disc to be braked rotatable in forward and reverse directions, and a pair of brake pad assemblies having friction surfaces engageable in braking relation with opposed sides of said disc,
   means for intermittently dressing said friction surfaces of said brake pad assemblies during brake operation, said dressing means comprising:
   a pair of dressing members mounted in slots formed through said disc opposed sides,
   means yieldably urging said dressing members toward engagement with said friction surfaces of said brake pad assemblies,
   said dressing members being movable in said slots so as to extend outward beyond said disc opposed sides and being oriented relative to said disc and said brake pad assemblies to dress said friction surfaces of said brake pad assemblies only when said disc is rotating in the reverse direction,
   and means limiting the dressing depth of said dressing members so as to obviate the dressing action when the brake is released and to limit the dressing depth when dressing action takes place.

2. In a disc brake assembly having a disc to be braked rotatable in forward and reverse directions, and a pair of brake pad assemblies having friction surfaces engageable in braking relation with opposed sides of said disc,
   means for intermittently dressing said friction surfaces of said brake pad assemblies during brake operation, said dressing means comprising:
   a pair of dressing members mounted in slots formed through said opposed sides,
   said dressing members being movable in said slots toward and away from said friction surfaces and having an elastomeric plug between said dressing members and operatively engaged therewith to be under compression due to action of said brake pad assemblies on said dressing members during brake actuation, said dressing members having at least an abrasive surface thereon engageable with said friction surfaces and oriented relative to said disc and said brake pad assemblies to dress said friction surfaces of said brake pad assemblies only when said disc is rotating in the reverse direction, the limit of expansion of said elastomeric plug effectively limiting the dressing depth of said dressing members so as to obviate the dressing action when the brake is released and to limit the dressing depth when dressing action takes place.

3. In a disc brake assembly having a disc to be braked rotatable in forward and reverse directions, and a pair of brake pad assemblies having friction surfaces engageable in braking relation with opposed sides of said disc,
   means for intermittently dressing said friction surfaces of said brake pad assemblies during brake operation, said dressing means comprising:
   a pair of dressing members mounted in slots formed through said disc opposed sides,
   said dressing members each comprising a cutter beveled to cut only in one direction of movement relative to said friction surfaces, that one direction being occasioned by reverse rotation of said disc, said slots having abutment surfaces therein engageable by said dressing members upon movement of said dressing members toward said friction surfaces and limiting the depth of cut of said dressing member during the dressing action.

4. In a disc brake assembly having a disc to be braked rotatable in forward and reverse directions, and a pair of brake pad assemblies having friction surfaces engageable in braking relation with opposed sides of said disc,
  means for intermittently dressing said friction surfaces of said brake pad assemblies during brake operation, said dressing means comprising:
  a pair of dressing members mounted in slots formed through said disc opposed sides,
  said dressing members each comprising an abrasive surfaced cylinder mounted on a pin in said disc by a one-way clutch for rotation on said pin in one direction and locking against rotation on said pin in the other direction, a chordal section of said cylinder extending through said slots so that the cylinder abrasive surfaces are engageable with said friction surface to be rotatably driven thereby when said disc is rotating in the forward direction and the brake is actuated to obviate the dressing action, and being held against rotation on the pins when the brake is actuated and the disc is rotating in the reverse direction so that the cylinder abrasive surfaces dress said friction surface,
  said pins being mounted for translatory movement in said slots and having means yieldably urging them and therefore said cylinders toward said brake pad assemblies, said slots being generally cylindrically formed by arcuate wall sections separated at said disc opposed side surface by a minor chordal distance of lesser magnitude than the diameter of said cylinders through which said cylinder chordal sections extend, and means limiting the translatory movement of said pins toward said brake pad assemblies to limit the dressing depth of said cylinder abrasive surfaces and prevent engagement of said cylinder abrasive surfaces with said slot arcuate wall sections.

5. In a disc brake assembly having a disc to be braked rotatable in forward and reverse directions, and a pair of brake pad assemblies having friction surfaces engageable in braking relation with opposed sides of said disc,
  means for intermittently dressing said friction surfaces of said brake pad assemblies, said dressing means comprising:
  a pair of dressing members mounted in slots formed through said disc opposed sides,
  means yieldably urging said dressing members toward engagement with said friction surfaces of said brake pad assemblies,
  said dressing members being movable in said slots so as to extend outward beyond said disc opposed sides and being oriented relative to said disc and said brake pad assemblies to dress said friction surfaces of said brake pad assemblies only when said disc is rotating in the reverse direction,
  and means limiting the dressing depth of said dressing members when dressing action takes place.

6. In a brake assembly, a rotatable member to be braked having a friction surface and rotatable in forward and reverse directions, and brake shoe means having friction surface means engageable in braking relation with said rotatable member friction surface,
  and means for intermittently dressing said friction surface means of said shoe means, said dressing means comprising:
  at least one dressing member means mounted in slot means formed in said rotatable member and extending through said rotatable member friction surface,
  means yieldably urging said dressing member means toward engagement with said friction surface means of said brake shoe means,
  said dressing member means being movable in said slot means so as to extend out of and beyond said rotatable member friction surface and being oriented relative to said rotatable member and said brake shoe means to dress said friction surface means of said brake shoe means only when said rotatable member is rotating in the reverse direction,
  and means limiting the dressing depth of said dressing member means when dressing action takes place.

* * * * *